June 24, 1969  R. L. ROBINSON  3,451,668
CLAMPING DEVICE HAVING A CAPTIVE NUT
Filed April 24, 1967
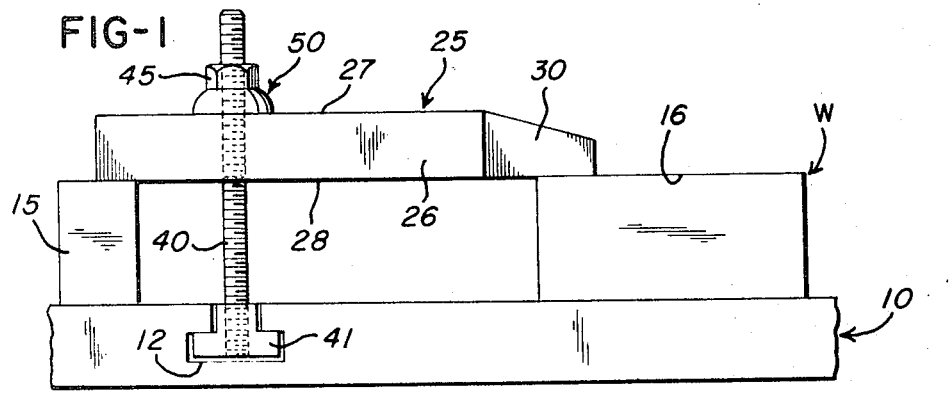
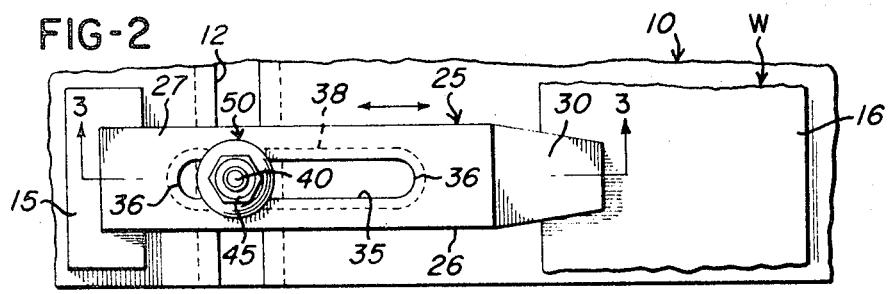
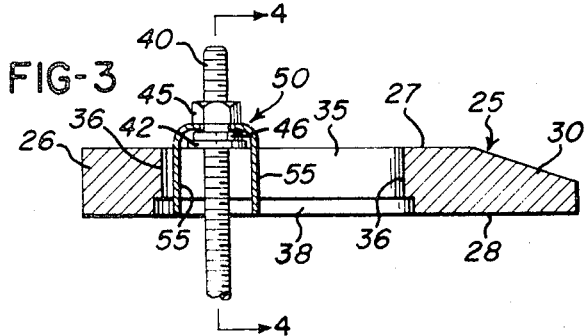
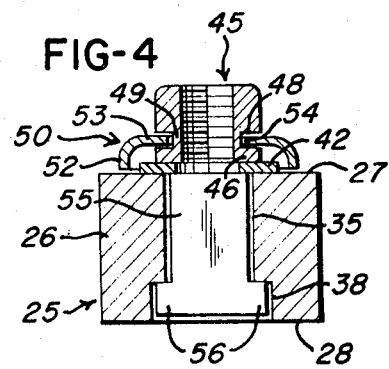
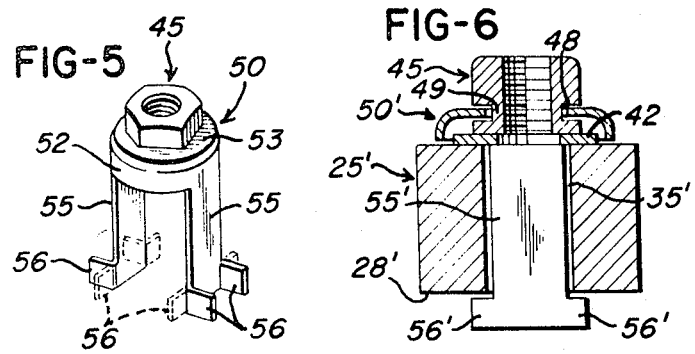
INVENTOR
ROLAND L. ROBINSON
BY
*Marechal, Biebel, French & Bugg*
ATTORNEYS United States Patent Office 3,451,668
Patented June 24, 1969

3,451,668
CLAMPING DEVICE HAVING A CAPTIVE NUT
Roland L. Robinson, 202 Park End Drive,
Dayton, Ohio 45415
Filed Apr. 24, 1967, Ser. No. 633,098
Int. Cl. B23q 3/02; F16b 39/00
U.S. Cl. 269—93                 10 Claims

ABSTRACT OF THE DISCLOSURE

An elongated workpiece clamp having a longitudinally extending slot for receiving a threaded stud extending upwardly from a table supporting the workpiece, and including an inverted U-shaped sheet metal bracket slidably mounted within the slot and having a head portion rotatably retaining a nut and washer adjacent the top surface of the clamp in sliding alignment with the slot.

Background of the invention

A workpiece is commonly secured to a movable or stationary worktable of a machine tool by employing two or more strap clamps of which the forward end or nose portion engages the workpiece and the rear end portion rests on a spacing block supported by the table. Each strap clamp usually includes a longitudinally extending slot for receiving a bolt or threaded stud connected to the table by a T-nut inserted within an inverted T-shaped slot formed within the table. Each clamp is tightened by placing a hardened washer and nut on the corresponding stud and then tightening the nut with a suitable wrench.

Usually the washers and nuts are stored together in a suitable portable container or case and are individually mounted or placed on the studs after the clamps and spacing blocks are positioned. This type of storage and the individual handling of the washers and nuts significantly increases the setup time required for securing a workpiece to the table and frequently the washers and nuts drop on the floor or are lost or mislaid.

Summary of the invention

The present invention is directed to a strap clamp which carries with it a nut and hardened washer in sliding aligned relationship with the slot formed in the clamp and thereby significantly decreases the time required for securing a workpiece to the table of a machine tool. Thus as a primary object, the present invention provides a strap clamp having a captive nut and washer retained by a sheet metal bracket slidably mounted on the clamp.

According to a preferred construction of a clamping device constructed in accordance with the invention, the sheet metal bracket includes a head portion which rotatably supports the nut above the clamp and confines the washer between the nut and the clamp. The bracket further includes a pair of parallel spaced legs which extend downwardly from the head portion through the slot formed within the clamp with the legs disposed in longitudinal spaced relation for receiving the stud therebetween. The lower end portions of the legs are provided with ears which are bent outwardly after inserting the legs through the slot so that the ears engage the bottom surface of the clamp or the upper surface of a recess formed within the bottom portion of the clamp surrounding the slot and thereby retain the bracket for slidable movement within the slot.

The construction of the nut retaining bracket and its assembly on the clamp in accordance with the invention assures that the nut and washer will be positively retained in alignment with the slot and is especially suited for mounting on a strap clamp of conventional construction. Furthermore, the bracket is of economical construction and is simple to assemble or disassemble should it become necessary to replace a nut because its threads were accidentally damaged. The nut retaining bracket also provides for supporting the clamp in a convenient elevated position on the stud, as for example, when the clamp is rotated on the stud to release the clamp from the workpiece while interchanging workpieces or repositioning the workpiece.

Other advantages and features of the invention will be apparent from the following description, the accompanying drawing and the appended claims.

Brief description of the drawing

FIG. 1 is an elevational view of a clamping device constructed in accordance with the invention and illustrating its use for clamping a workpiece to the table of a machine tool;

FIG. 2 is a plan view of the clamping device shown in FIG. 1;

FIG. 3 is a section of the clamping device as taken generally along the line 3—3 of FIG. 2;

FIG. 4 is a section taken generally on the line 4—4 of FIG. 3;

FIG. 5 is a perspective view of a nut and bracket subassembly prior to mounting on a clamp; and FIG. 6 is a view similar to FIG. 4 showing a modified form of the invention.

Description of preferred embodiments

Referring to FIG. 1 10 refers to a worktable of a machine tool and which commonly includes a series of parallel spaced inverted T-shaped slots 12. As mentioned above, the worktable 10 may be stationary or movable in a horizontal and/or vertical direction depending upon the type of machine tool. A workpiece W, represented by a rectangular block, is positioned on the table 10 on one side of the slot 12 and a spacing block 15 is positioned on the opposite side of the slot. The spacing block 15 is selected so that its height is substantially the same as the height of the desired clamping surface 16 on the workpiece W.

A strap clamp 25 comprises an elongated body 26 having a flat upper surface 27 and a parallel spaced flat bottom surface 28 with a forward end portion engaging the surface 16 of the workpiece W and a rear end portion engaging the top surface of the spacing block 15. The forward nose portion 30 of the clamp 25 may be tapered as shown in FIGS. 1 and 2 to provide for arranging a series of clamps in closely spaced relation around a workpiece.

Referring to FIGS. 2–4, a longitudinally extending slot 35 is formed within the clamp body 26 between the upper surface 27 and the lower surface 28 and has opposite semicylindrical end surfaces 36. As shown in FIGS. 3 and 4, an elongated recess 38 extends from the lower surface 28 of the clamp body 26 and surrounds the lower end of the slot 35.

An elongated screw or threaded stud 40 has a lower end portion threaded into a T-nut 41 which is slidably received within the slot 12 and an upper end portion which projects through the slot 35 and above the upper surface 27 of the clamp body 26. A hardened steel washer 42 is mounted on the upper end portion of the stud 40 adjacent the top surface 27 of the clamp body 26 and a nut 45 is threaded on the stud above the washer 42. The nut 45 includes a lower cylindrical portion 46 in which is formed a circumferential groove 48 defining a neck portion 49.

A bracket 50, formed of sheet metal, includes an inverted cup-shaped head portion 52 having a lip 53 which is formed inwardly into the groove 48 by a suitable die.

The lip 53 defines a circular opening 54 which surrounds the neck potion 49 of the nut 45 and substantial clearance is provided between the lip 53 and the nut so that the nut is free to wobble slightly in addition to rotate. Thus the head portion 52 of the bracket 50 both retains the nut 45 and confines the washer 42 in general alignment below the nut.

The bracket 50 further includes a pair of parallel spaced legs 55 which are formed integrally with the head portion 52 and extend downwardly through the slot 35. As shown in FIGS. 3 and 4, the legs 55 are spaced longitudinally within the slot 35 and each have a width slightly less than the slot 35 to provide for free sliding logitudinal movement of the bracket 50 within the slot 35.

Referring to FIG. 5, the lower end portion of each leg 55 includes a pair of tabs or ears 56 which project outwardly into the recess 38 and thereby retain the bracket 50 for sliding movement within the slot 35 with the head portion 52 adjacent the top surface 27 of the clamp so that both the nut 45 and washer 42 are retained in alignment with the slot 35. As shown in FIG. 5, the ears 56 on each leg 55 are initially formed in parallel spaced relation so that the legs 55 may be inserted into the slot 35 after which the ears 56 are bent outwardly with a suitable pair of pliers to retain the bracket 50 on the clamp 25.

Referring to FIG. 6, a modified form of the invention is shown in conjunction with a standard or conventional strap clamp 25' which does not have a recess 38 adjacent its bottom surface 28'. In this modification, the bracket 50' is constructed substantially the same as the bracket 50 except that the legs 55' are slightly longer and the ears 56' are bent to project outwardly adjacent the bottom surface 28'. While the assembly shown in FIGS. 1–4 is preferred so that the legs 55 do not project below the bottom surface 28 of the clamp body 26, FIG. 6 illustrates how a conventional strap clamp can be provided with a captive nut and washer in accordane with the invention without any modification of the clamp.

From the drawing and the above description, it can be seen that a strap clamp having a captive nut and washer retained in accordance with the present invention provides several desirable features and advantages. For example, the formed sheet metal bracket 50 provides a positive, durable and economical means for retaining the nut 45 and washer 42 on the strap clamp 25 so that the washer and nut are at all times carried by the clamp. As a result, the time required to secure a workpiece to a worktable is minimized which is especially desirable for short run machining operations to avoid substantial downtime of the machine tool.

Furthermore, the depending legs 55 and the bendable ears 56 provide for positively retaining the bracket 50 on the clamp 25 with the nut and washer in sliding aligned relation with the slot 35, and also provide for convenient replacement of a bracket and nut sub-assembly should the threads of the nut be accidentally damaged. In addition, the assembly of the clamp and nut retaining bracket shown in FIGS. 1–4 eliminates any projections from the sides or bottom surfaces of the clamp 25 which is desirable for convenient handling and storage of the clamps.

The loose and freely rotatable mounting of the nut 45 on the bracket 50 also enables the clamp body 26 to teeter slightly on the stud 40 so that the clamping surface 16 on the workpiece W and the top surface of the spacing block 15 do not have to be at precisely the same elevation. Furthermore, as mentioned above, the nut retaining bracket 50 provides for supporting the clamp 25 at a convenient elevated position and prevents it from dropping down on the stud 40 after the clamp is rotated away from the workpiece during repositioning the workpiece or interchanging workpieces.

While the forms of apparatus herein described constitute preferred embodiments of the invention, it is to be understood that the invention is not limited to these precise forms of apparatus, and that changes may be made therein without departing from the scope of the invention which is defined in the appended claims. For example, the nut and washer retaining bracket could be constructed so that it slides as a saddle on the clamp, that is, with legs extening downwardly along the sides of the clamp and having ears which project inwardly into corresponding longitudinally extending slots fomed within the sides of the clamp.

What is claimed is:

1. A clamping device for securing a workpiece to a table from which extends a threaded stud, comprising an elongated rigid clamp body having an upper surface and a lower surface with opposite end portions adapted to engage the workpiece and a spacing member, means defining a longitudinally extending slot within said body between said surfaces for receiving said stud, a nut positioned above said upper surface and adapted to be threaded on the stud to draw said body downwardly against the workpiece and the spacing member, a bracket having spaced legs connected by a head portion, means for mounting said bracket on said body for longitudinally sliding movement with said head portion positioned above said upper surface of said body, and means on said head portion of said bracket for retaining said nut for rotation in general alignment with said slot so that said nut is carried with said body in position for conveniently receiving said stud.

2. A clamping device as defined in claim 1 wherein said legs of said bracket extend through said slot in longitudinal spaced relation and are adapted to receive said stud therebetween, and said legs include lower end portions having outwardly projecting ears for retaining said bracket in longitudinally sliding relation within said slot.

3. A clamping device as defined in claim 2 including means defining a recess within said body adjacent said bottom surface and extending along at least one side of said slot, and said ears projecting outwardly into said recess to provide for slidably retaining said bracket on said body without said legs extending below said lower surface of said body.

4. A clamping device as defined in claim 1 including a hardened washer spaced between said nut and said upper surface of said body, and said head portion of said bracket including means for retaining said washer in general alignment with said nut and said slot.

5. A clamping device as defined in claim 1 wherein said head portion of said bracket includes means defining a hole, said nut extending through said hole, and said nut including means defining a circumferential external groove for receiving said head portion of said bracket and thereby provide for rotation of said nut relative to said bracket.

6. A device for mounting on an elongated clamp adapted for securing a workpiece to a worktable and having a longitudinally extending slot adapted to receive a threaded stud extending upwardly from the table, said device comprising a bracket having a head portion, a set of spaced legs extending from said head portion, means defining a hole within said head portion of said bracket, a nut member rotatably mounted within said hole, means for retaining said nut member within said hole, and each said leg including a lower end portion having projecting ear means for retaining said bracket on said clamp with said nut member in general alignment with said slot.

7. A device as defined in claim 6 wherein said head portion of said bracket includes means for confining and retaining a hardened washer adapted to be spaced between said clamp and said nut when said bracket is mounted on said clamp.

8. A device as defined in claim 6 wherein said ear means on each said leg comprise a pair of generally parallel spaced ears adapted to be bent outwardly after said legs are inserted within said slot.

9. A clamping device for securing a workpiece to a table, comprising an elongated rigid clamp body having an upper surface and a lower surface with opposite end portions adapted to engage the workpiece and a spacing member, means defining a longitudinally extending slot within said body between said surfaces, a threaded fastening member extending above said upper surface of said body, and means connected to said body for longitudinal sliding movement along said slot and retaining said fastening member for rotation and linear movement parallel to said upper surface of said body.

10. A clamping device for securing a workpiece to a table, comprising an elongated rigid clamp body having an upper surface and a lower surface with opposite end portions adapted to engage the workpiece and a spacing member, means defining a longitudinally extending slot within said body between said surfaces, a threaded fastening member extending above said upper surface of said body, a bracket having spaced legs connected by a head portion, means for mounting said bracket on said body for longitudinal sliding movement along said slot with said head portion positioned above said upper surface of said body, and means on said head portion of said bracket for retaining said fastening member for rotation relative to said body.

References Cited
UNITED STATES PATENTS

| | | | |
|---|---|---|---|
| 1,376,077 | 4/1921 | Cadwallader | 269—93 |
| 1,655,104 | 1/1928 | Oakley | 152—430 |

ROBERT C. RIORDON, *Primary Examiner.*

D. EVENSON, *Assistant Examiner.*

U.S. Cl. X.R.

151—41.7